US010664574B1

(12) United States Patent
Powers et al.

(10) Patent No.: US 10,664,574 B1
(45) Date of Patent: May 26, 2020

(54) DISTRIBUTED DATA STORAGE AND SHARING IN A PEER-TO-PEER NETWORK

(71) Applicant: Architecture Technology Corporation, Minneapolis, MN (US)

(72) Inventors: Judson Powers, Ithaca, NY (US); Paul Nicotera, Ithaca, NY (US); Ryan Marotz, Bloomington, MN (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 143 days.

(21) Appl. No.: 15/791,258

(22) Filed: Oct. 23, 2017

Related U.S. Application Data

(60) Provisional application No. 62/559,042, filed on Sep. 15, 2017.

(51) Int. Cl.
| | |
|---|---|
| *H04L 29/06* | (2006.01) |
| *G06F 21/10* | (2013.01) |
| *G06F 21/44* | (2013.01) |
| *G06F 21/62* | (2013.01) |
| *G06F 21/60* | (2013.01) |

(52) U.S. Cl.
CPC .............. *G06F 21/10* (2013.01); *G06F 21/44* (2013.01); *G06F 21/602* (2013.01); *G06F 21/6227* (2013.01); *G06F 2221/0751* (2013.01); *G06F 2221/2107* (2013.01)

(58) Field of Classification Search
CPC ........ G06F 21/10; G06F 21/44; G06F 21/602; G06F 21/6227; G06F 2221/0751; G06F 2221/2107
See application file for complete search history.

(56) References Cited

U.S. PATENT DOCUMENTS

| | | | | |
|---|---|---|---|---|
| 7,797,352 B1* | 9/2010 | Hopwood | ............... | G06F 21/10 707/804 |
| 8,458,494 B1* | 6/2013 | Bogorad | ................... | H04L 9/30 713/193 |

(Continued)

OTHER PUBLICATIONS

Webster, "Extending the Ground Force Network: Aerial Layer Networking", Apr. 25 2013, Retrieved from http://www.dtic.mil/dtic/tr/fulltext/u2/a602564.pdf, 49 pgs.

(Continued)

*Primary Examiner* — Ghodrat Jamshidi
(74) *Attorney, Agent, or Firm* — Shumaker & Sieffert, P.A.

(57) ABSTRACT

In general, the disclosure is directed to data storage within a peer-to-peer network that includes a plurality of computing devices. A first computing device of the peer-to-peer network stores an encrypted file in a data storage component. The first computing device creates file information metadata comprising details of the encrypted file and peer information metadata comprising details of the first computing device. The first computing device updates a file distributed hash table to include the file information metadata and a peer distributed hash table to include the peer information metadata. At least a portion of the file distributed hash table is stored on a first group of one or more computing devices of the plurality of computing devices. Further, at least a portion of the peer distributed hash table is stored on a second group of one or more computing devices of the plurality of computing devices.

17 Claims, 5 Drawing Sheets

(56) References Cited

U.S. PATENT DOCUMENTS

| | | | | |
|---|---|---|---|---|
| 8,613,108 B1* | 12/2013 | Aggarwal | | H04L 63/101 |
| | | | | 455/411 |
| 8,977,660 B1* | 3/2015 | Xin | | H04N 21/23103 |
| | | | | 707/747 |
| 10,181,049 B1* | 1/2019 | El Defrawy | | G06F 21/6227 |
| 2002/0129022 A1* | 9/2002 | Majewski | | G06F 16/25 |
| 2003/0079100 A1* | 4/2003 | Williams | | G06F 11/1435 |
| | | | | 711/165 |
| 2006/0056625 A1* | 3/2006 | Nakabayashi | | H04L 9/0662 |
| | | | | 380/46 |
| 2009/0070841 A1* | 3/2009 | Buga | | H04L 67/12 |
| | | | | 725/116 |
| 2009/0154703 A1* | 6/2009 | Price | | H04L 9/0897 |
| | | | | 380/277 |
| 2011/0022640 A1* | 1/2011 | Franco | | H04L 51/00 |
| | | | | 707/802 |
| 2012/0054744 A1* | 3/2012 | Singh | | G06F 21/53 |
| | | | | 718/1 |
| 2012/0297188 A1* | 11/2012 | van der Linden | | H04L 63/045 |
| | | | | 713/165 |
| 2012/0304313 A1* | 11/2012 | Mao | | H04L 63/101 |
| | | | | 726/29 |
| 2013/0041982 A1* | 2/2013 | Shi | | H04L 65/4084 |
| | | | | 709/217 |
| 2013/0173530 A1* | 7/2013 | Laron | | G06F 16/1734 |
| | | | | 707/608 |
| 2014/0281486 A1* | 9/2014 | Nayshtut | | G06F 21/6227 |
| | | | | 713/153 |
| 2014/0281514 A1* | 9/2014 | Erofeev | | H04L 9/0897 |
| | | | | 713/165 |
| 2016/0078245 A1* | 3/2016 | Amarendran | | G06F 16/164 |
| | | | | 713/193 |
| 2016/0127380 A1* | 5/2016 | Steele | | H04L 63/102 |
| | | | | 726/7 |
| 2017/0272209 A1* | 9/2017 | Yanovsky | | H04L 67/1097 |
| 2017/0372094 A1* | 12/2017 | Hore | | H04L 63/0428 |

OTHER PUBLICATIONS

Chairman Joint Chiefs of Staff, "Joint Concept for Command and Control of the Joint Aerial layer Network," Mar. 20, 2015 (Distribution A—Public Release), Retrieved from http://www.dtic.mil/doctrine/concepts/joint_concepts/joint_concept_aerial_layer network.pdf, 85 pgs.

Schug et al., "Air Force Aerial Layer Networking Transformation Initiatives", IEEE Military Communications Conference, Nov. 2011, 5 pgs.

* cited by examiner

US 10,664,574 B1

DISTRIBUTED DATA STORAGE AND SHARING IN A PEER-TO-PEER NETWORK

This application claims the benefit of U.S. Provisional Application No. 62/559,042, filed Sep. 15, 2017, the entire content of which is incorporated herein by reference.

TECHNICAL FIELD

The disclosure relates to secure data storage and sharing in a peer-to-peer network.

BACKGROUND

Net-enabled combat capability, or the ability to utilize devices with network connectivity in areas generally devoid of the requisite infrastructure, is an asset for which growing demand is expected to exceed supply. In hostile and anti-access environments (i.e., areas generally devoid of the requisite infrastructure to enable network connectivity), tactical networks are more susceptible to nodes being compromised or leaving the network. Mobile computing devices with network routing capabilities may act as airborne network layers, as they can deliver connection points from a high vantage point to bridge otherwise disparate enclaves (e.g., end user devices) in the network. Airborne networks are envisioned as an infrastructure consisting of Internet protocol (IP) based airborne nodes and on-board platforms which provide interconnectivity between terrestrial and space networks forming a Global Information Grid (GIG). In an example Joint Aerial Layer Network (JALN) vision, the airborne network augments and extends the existing aerial layer networks and supports operations in permissive (e.g., networks that utilize intermediate end-user devices to transfer data from one device to another), contested (e.g., networks where other, competing networks attempt to degrade the connectivity of the allied network), and anti-access (e.g., environments that explicitly jam network signals) environments against both kinetic (e.g., physical) and non-kinetic (e.g., electronic or data driven) threats. Aerial tactical nodes (e.g., airborne computing devices with routing capabilities that enable the execution of a peer-to-peer network) can be positioned more flexibly than fixed-orbit satellite communication (SATCOM) links. However, airborne network assets are a scarce resource. The nodes may be strategically positioned and shared between ongoing missions in order to enhance communication efficiency and reduce data transfer overhead.

The transient topology of aerial layer tactical networks poses a significant challenge to maintaining data availability, as one or more nodes may leave or join the network at any time. A computing node supplying mission-critical data may unexpectedly lose its network connectivity or become compromised. Current tactical network technologies provide no alternative means for accessing data when the source becomes completely unreachable. Furthermore, the critical data being stored and transmitted over the airborne network is preferably protected against hostile activity, such as attempts to exfiltrate sensitive data.

Most commercial solutions for data storage and sharing technologies are not directly applicable to the airborne networks because of their limited capabilities and their unique characteristics. The airborne network consists of highly dynamic airborne nodes with diverse capabilities and specifications, often highly specialized, such as intelligence, surveillance, reconnaissance, planning, command, control, and storage. Node mobility often results in significant network dynamics, such as intermittent connectivity, which in turn results in continuously changing network topology and changing routes to the information of interest. Moreover, information and data may not be accessible if the information source leaves the network or if the communication links to the node are disrupted.

SUMMARY

In general, the disclosure is directed to secure data storage and sharing within a peer-to-peer network that includes a plurality of computing devices. A first computing device of the peer-to-peer network stores an encrypted file in a data storage component. The first computing device creates file information metadata comprising details of the encrypted file and peer information metadata comprising details of the first computing device. The first computing device updates a file distributed hash table to include the file information metadata and a peer distributed hash table to include the peer information metadata. At least a portion of the file distributed hash table is stored on a first group of one or more computing devices of the plurality of computing devices. Further, at least a portion of the peer distributed hash table is stored on a second group of one or more computing devices of the plurality of computing devices.

In one example, the disclosure is directed to a method that includes storing, by a first computing device in a peer-to-peer network comprising a plurality of computing devices, an encrypted file in a data storage component. The method further includes creating, by the first computing device, file information metadata comprising details of the encrypted file. The method also includes creating, by the first computing device, peer information metadata comprising details of the first computing device. The method further includes updating, by the first computing device, a file distributed hash table to include the file information metadata and a peer distributed hash table to include the peer information metadata. At least a portion of the file distributed hash table is stored on a first group of one or more computing devices of the plurality of computing devices. Further, at least a portion of the peer distributed hash table is stored on a second group of one or more computing devices of the plurality of computing devices.

In another example, the disclosure is directed to a first computing device in a in a peer-to-peer network comprising a plurality of computing devices. The first computing device includes a memory configured to store an encrypted file. The first computing device further includes at least one processor in communication with the memory. The at least one processor is configured to create file information metadata comprising details of the encrypted file. The at least one processor is further configured to create peer information metadata comprising details of the first computing device. The at least one processor is further configured to update a file distributed hash table to include the file information metadata and a peer distributed hash table to include the peer information metadata. At least a portion of the file distributed hash table is stored on a first group of one or more computing devices of the plurality of computing devices. Further, at least a portion of the peer distributed hash table is stored on a second group of one or more computing devices of the plurality of computing devices.

In another example, the disclosure is directed to a computer readable storage medium storing instructions that, when executed, cause one or more processors of a first computing device in a peer-to-peer network comprising a plurality of computing devices to store an encrypted file in a data storage component. The instructions further cause the one or more processors to create file information metadata comprising details of the encrypted file. The instructions further cause the one or more processors to create peer information metadata comprising details of the first computing device. The instructions further cause the one or more processors to update a file distributed hash table to include the file information metadata and a peer distributed hash table to include the peer information metadata. At least a portion of the file distributed hash table is stored on a first group of one or more computing devices of the plurality of computing devices. Further, at least a portion of the peer distributed hash table is stored on a second group of one or more computing devices of the plurality of computing devices.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
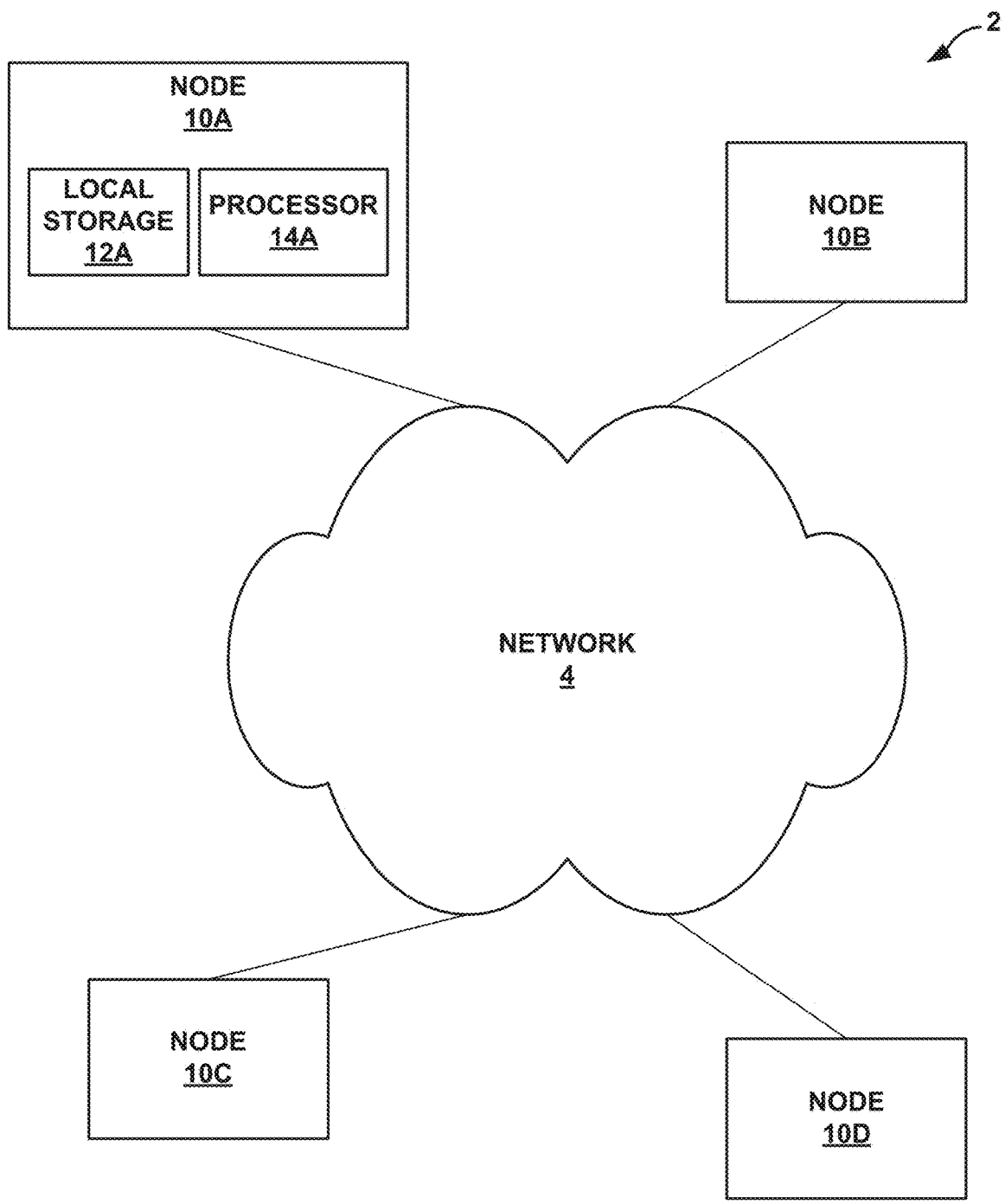
FIG. 1 is a block diagram illustrating an example peer-to-peer network that includes a plurality of nodes configured to store and distribute encrypted files in a distributed manner, in accordance with one or more techniques of this disclosure.

In general, the disclosure is directed to distributed data storage and data sharing within a peer-to-peer network that includes a plurality of computing devices. The computing devices within the peer-to-peer network store encrypted versions of the shared files locally on their own systems. Further, the peer-to-peer network utilizes two distributed hash tables: a file distributed hash table and a peer distributed hash table. The file distributed hash table includes metadata describing various files and file segments that are stored on computing devices throughout the peer-to-peer network. The peer distributed hash table includes metadata describing the various computing devices within the peer-to-peer network. The combination of these distributed hash tables acts as an index referenceable by the various nodes of the peer-to-peer network to determine which nodes store which portions of various files and how to access such nodes.

Existing tactical network encryption protects against surveillance of intercepted communications (data in transit), and the preconfigured network plans and authentication mechanisms harden against imposter activity. However, this protection only covers the portion of tactical network communications between the sending and receiving nodes' cryptographic modules, such as the "black side" of Soldier Radio Waveform (SRW) networks. Data is then decrypted for end-use, such as on the "red side" of SRW networks for processing by End User Devices (EUDs) connected to Tactical Radios (TRs). Another deficiency in commercial networks is that the network nodes are not trusted and secured.

This disclosure also describes an information assurance and sharing software for tactical airborne networks that protects data at rest (e.g., while being stored) and in transit (e.g., while being transmitted) while making data available even when some nodes on the network leave or become compromised. The data stored in network are secured even when a small number of storage nodes are compromised. The techniques described herein employ various encryption and authentication (e.g., Public Key Infrastructure (PKI)) technologies to encrypt and certify data as it is generated and stored. The techniques also include peer-to-peer data sharing techniques to efficiently replicate and resiliently transfer assured information to other computing devices in the peer-to-peer network in encrypted form. Using the techniques described herein, a peer-to-peer network with nodes having high volatility may provide data and shared files to other nodes within the network despite dynamic network topologies. The peer-to-peer network may preserve and share a number of files with a minimal number of available, trusted computing nodes, while also securing the data throughout its lifecycle. The techniques of this disclosure further enhance information assurance and data availability for tactical networks, including agile communications and airborne networks, with minimal impact on communications and storage overhead. The techniques described herein may also enable adaptation to network dynamics, such as network splitting, merging and node leaving, to make available the data to users most of the time.

FIG. 1 is a block diagram illustrating an example system 2 that includes peer-to-peer network 4 that includes a plurality of nodes 10A-10D configured to store encrypted files in a distributed manner, in accordance with one or more techniques of this disclosure. In general, a peer-to-peer network may be a distributed application architecture that partitions tasks or workloads between peers. Nodes of a peer-to-peer network may make a portion of their resources, such as processing power, disk storage, or network bandwidth, directly available to other network participants, without the need for central coordination by servers or stable hosts. As such, peers may take the role of both suppliers and consumers of resources, in contrast to the traditional client-server model in which the consumption and supply of resources is, generally, strictly divided. System 2 is shown to include peer-to-peer network 4 and four nodes 10A, 10B, 10C, and 10D connected via the peer-to-peer network. This specific arrangement of devices, however, is only a single example configuration of system 2. In other configurations, there may be more nodes or fewer (as few as zero) nodes operably connected to one another via peer-to-peer network 4 than shown in FIG. 1.

Peer-to-peer network 4, in some examples, operates within a distributed computing system connected via a communications network. In other examples, peer-to-peer network 4 may include independent computing devices that each participate in the peer-to-peer network. In general, peer-to-peer network 4 may be any IP-compatible network or IP-encapsulated network. For example, peer-to-peer network 4 may consist of an Internet Protocol (IP)-based network in which nodes 10A-10D exchange data packets or cells using any number of communications protocols, including the transmission control protocol (TCP) or other protocols. Peer-to-peer network 4 may operate as any one or more of a mobile ad-hoc network, an unstructured peer-to-peer network, a tactical airborne network, a secure peer-to-peer network, a structured peer-to-peer network, named data networks, or a hybrid network that consists of a peer-to-peer network combined with a client server network.

Peer-to-peer network 4 may be an architecture that partitions processes between peers, with the peers being equally privileged, equipotent network devices or applications. In an unstructured peer-to-peer network, the node links may be established arbitrarily. Such networks may be easily constructed, as any time a new peer attempts to join the network, the peer may join the network by copying existing links of another peer node. The peer may form new links and modify its links over time. Conversely, if the overlay is organized into a specific topology and the peer-to-peer network protocol ensures that any node can efficiently search the network for a file/resource then the peer-to-peer network is termed structured.

A mobile ad hoc network may be a continuously self-configuring, infrastructure-less network of mobile devices connected by a wireless communication mechanism (e.g., Wi-Fi or radio signals). A tactical airborne network may be designed to provide protected air-to-air communications for military aircraft. Tactical airborne networks may utilize significant design sophistication due to the need to provide higher capacity, longer range, greater flexibility, and increased interoperability due to domain characteristics particular to tactical airborne networks, such as long transmission ranges, low-to-medium data rates, latency constraints, and link protection requirements.

A hybrid peer-to-peer and client server network may utilize a combined architecture that generally uses capabilities of both types of networks. Typically, the peer-to-peer portion of the network is built using an overlay technology. A secure peer-to-peer network may be a peer-to-peer network that has had some types of security mechanisms added to the architecture to attempt to counter some of the vulnerabilities of a general peer-to-peer network.

Nodes 10A-10D (collectively, nodes 10) are communication devices that include a local storage device (e.g., local storage 12A) and one or more processors (e.g., processor 14A) configured to perform the techniques described herein. For instance, nodes 10 may be a processing unit on any one of a tablet computer, a smartphone, a personal digital assistant (PDA), a laptop computer, a navigation system, a digital camera, a computerized vehicle, a computerized aircraft, a weapons system, a satellite system, a surveillance drone, an unmanned aerial vehicle (UAV), a computerized aquatic vehicle, a computerized watch (e.g., a smart watch), computerized eyewear, computerized headwear, other types of wearable computing devices, a media player, a television platform, or any other type of mobile and/or non-mobile computing device that is configured to perform a media operation as described herein.

Nodes 10 may include one or more storage devices (e.g., local storage device 12A). In some examples, local storage device 12A may include one or more computer-readable storage media. Local storage device 12A may be configured to store larger amounts of information than volatile memory. Storage devices 30 may further be configured for long-term storage of information. In some examples, storage devices 30 include non-volatile storage elements. Examples of such non-volatile storage elements include magnetic hard disks, optical discs, floppy disks, flash memories, or forms of electrically programmable memories (EPROM) or electrically erasable and programmable (EEPROM) memories.

The computer-readable storage media of local storage device 12A may include volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 14A.

As will be explained in more detail below, each of nodes 10 may store at least a portion of a file distributed hash table and a peer distributed hash table in local storage device 12A. The file distributed hash table and the peer distributed hash table may each be separate tables stored on nodes throughout peer-to-peer network 4 in a distributed manner and encrypted using a hash function. The file distributed hash table may include various metadata associated with one or more encrypted files stored in local storage device 12A and encrypted files stored on other nodes in peer-to-peer network 4 (e.g., encrypted files stored on local storage devices of nodes 10B, 10C, and 10D). For instance, the file distributed hash table may include a file segment size, a file header, a cryptographic hash value of a segment of the encrypted file stored at the first computing device, an identifier of the computing device storing the encrypted file, and an identifier of the encrypted file. Similarly, the peer distributed hash table may include various metadata associated with the various nodes 10 that are a part of peer-to-peer network 4. For instance, the peer distributed hash table may include an indication of an identity of the first computing device, a clearance level of the first computing device, a connection status, an internet protocol address, and public key information.

Nodes 10 may further include one or more processors (e.g., processor 14A). Although shown in FIG. 1 as a single processor 14A, nodes 10 may include a plurality of processors operating together or in parallel to perform the techniques described herein. Processor 14A, in one example, is configured to implement functionality and/or process instructions for execution within node 10A. For example, processor 14A may be capable of processing instructions stored in a storage device (e.g., local storage 12A) of node 10A. Examples of processor 14A may include, any one or more of a microprocessor, a controller, a digital signal processor (DSP), an application specific integrated circuit (ASIC), a field-programmable gate array (FPGA), or equivalent discrete or integrated logic circuitry.

In accordance with the techniques of this disclosure, processor 14A of node 10A may store an encrypted file in local storage device 12A. For instance, node 10A may be a tablet computer connected to peer-to-peer network 4. Node 10B may be a vehicle with an on-board system communicatively connected to peer-to-peer network 4. The encrypted file may contain coordinates of a location that the vehicle must navigate to for a particular mission. In other examples, the file may contain any data, information, executable code, bit combinations, long-term data files, short-term communication files, live streaming data, permanent streaming data, or any combination of the above, including descriptions of tracks, waypoints, imagery, statuses, high-resolution surveillance imagery, etc.

Processor 14A of node 10A may create file information metadata comprising details of the encrypted file. For instance, processor 14A may determine, for the file containing the coordinates, a file segment size of the encrypted file, a file header for the encrypted file, a cryptographic hash value of a segment of the encrypted file stored at node 10A, an identifier of node 10A, or an identifier of the encrypted file. Processor 14A may then create metadata that corresponds to the determined information.

Processor 14A of node 10A may also create peer information metadata comprising details of node 10A. For instance, processor 14A of node 10A may determine an identity of node 10A, a clearance level of node 10A, a connection status of node 10A, an internet protocol address of node 10A, or public key information for node 10A. Processor 14A may then create an indication of such information in the form of peer information metadata.

Processor 14A may update a file distributed hash table to include the file information metadata and a peer distributed hash table to include the peer information metadata. At least a portion of the file distributed hash table is stored on a first group of one or more nodes of nodes 10, and at least a portion of the peer distributed hash table is stored on a second group of one or more nodes of nodes 10. For instance, each of nodes 10 may store at least a portion of the file distributed hash table and/or the peer distributed hash table.

Each of nodes 10 may retrieve the various portions of the file distributed hash table and the peer distributed hash table, either from their own local storage devices or from other nodes, in order to determine a mapping of the file storage environment. For instance, node 10B may require the encrypted file that contains the coordinates of the location that node 10B must travel to. As such, node 10B may retrieve the file distributed hash table in order to determine information regarding the encrypted file and which of nodes 10 is storing a local copy of the encrypted file. After determining that node 10A is storing a copy of the encrypted file of the coordinates needed by node 10B, node 10B may utilize the peer distributed hash table in order to determine various characteristics of node 10A such that node 10B may send a request for the encrypted file to node 10A. Upon receiving the request, node 10A may check the peer distributed hash table for clearance information for node 10B to ensure that node 10B is not receiving any information above the clearance level for node 10B. If node 10A verifies that node 10B may receive the file, node 10A may send a copy of the encrypted file, in encrypted form, across peer-to-peer network 4 to node 10B. Node 10B may locally decrypt the encrypted file in volatile memory when reading the file to determine the coordinates.

The techniques described herein may utilize multitracker torrent files, which enable more resilient tracking for secure-source files that are marked "private" in information metadata (i.e., the files cannot be altered without redefining the torrent descriptor). This ensures that only clients with access to the tracker can obtain secure-source files.

In accordance with the techniques of this disclosure, node 10A may encrypt the shared file's content before generating portion-hashes and distributed hash table entries, thereby obfuscating the file content to all peers and preventing access without the associated decryption password. The password will only be known to authorized users of the file and could be distributed out-of-band for added security.

Further access granularity could be introduced by implementing read-only and read-write decryption passwords for certain files, which would enable content generators to provide users with the minimum necessary access privileges. The downloaded file will be encrypted on storage device 12A, and depending on the scenario, the file may remain encrypted and only be decrypted in-memory during actual use. This prevents compromised nodes from accessing the file contents on disk, providing security of data-at-rest.

Each file segment may be protected by a cryptographic hash contained in a file that contains metadata about the file segment to be stored and distributed (e.g., a torrent or other metadata format descriptor of a peer-to-peer-shared file. This ensures that any modification of the piece can be reliably detected, and thus prevents both accidental and malicious modifications of any of the pieces received at other nodes. If node 10A starts with an authentic copy of the metadata descriptor, node 10A may verify the authenticity of the entire file it receives. Therefore, compromised nodes can at worst cause unnecessary network traffic by providing incorrect versions of file pieces, which will fail subsequent hash checks at the destination node and require re-downloading from a different peer node of nodes 10. In this way, potentially compromised nodes can be quickly identified and communicated between peers to minimize their impact on network activity.

The techniques described herein may combine PKI/trust-center-based information assurance and peer-to-peer networking to deliver end-to-end protection of data, authentication of data provenance, and bottleneck-resistant data distribution. Peer-to-peer sharing significantly increases data availability by providing many redundant, known sources for each segment of information. Data integrity may be automatically validated as part of the peer-to-peer sharing process, which also protects against malicious modification of any shared files. The techniques described herein may be readily compatible with many computing platforms, including embedded systems and hardware running real-time operating systems. These techniques may be deployed on computing devices at all layers of the tactical network infrastructure, enabling these devices to participate in the peer-to-peer encrypted data sharing process.

The degree of data replication and other peer-to-peer sharing policies can be adjusted dynamically in real-time in response to network dynamics, so information remains accessible during high and low connectivity conditions with minimal storage overhead. The security features provided by the described PKI system are also configurable based on the needs of each deployed operating environment, such as whether to apply user-specific private keys and one-time-use data keys for digital signature authentication. For instance, the specific encryption algorithms, the distribution of keys within the peer-to-peer network, the type of keys used for digital signature authentication, the minimum number of devices that must hold a copy of a file, or any other feature that may affect the functions of the techniques described herein may be configurable by a host or the devices within the peer-to-peer network. The distributed peer tracking and file sharing metadata can be separately encrypted and signed so only authorized users have knowledge of what data is being shared and by which peers.

Figure 2:
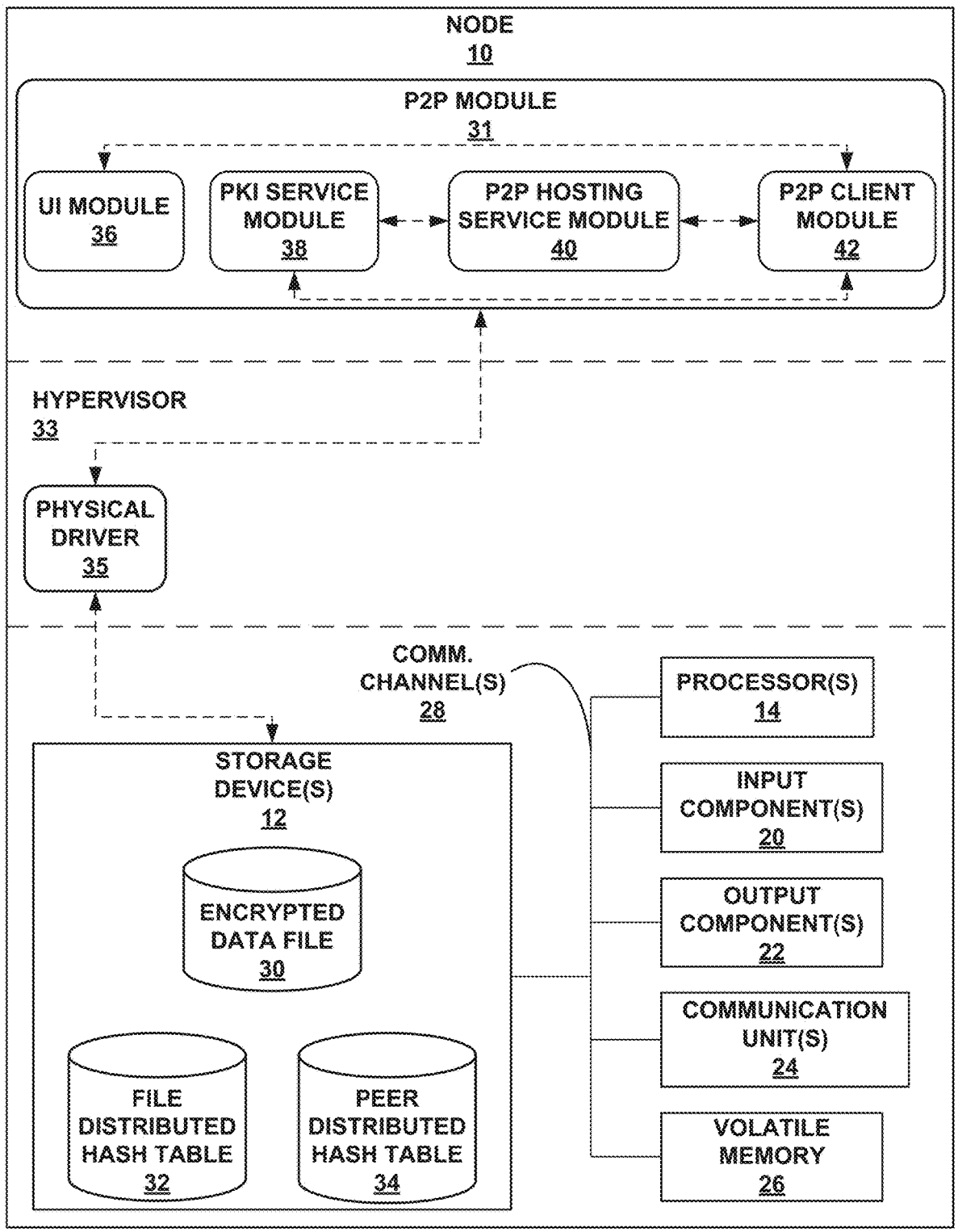
FIG. 2 is a block diagram illustrating an example node configured to store and distribute encrypted files in a distributed manner on a peer-to-peer network, in accordance with one or more techniques of this disclosure.

FIG. 2 is a block diagram illustrating an example node 10 configured to store encrypted files in a distributed manner on a peer-to-peer network, in accordance with one or more techniques of this disclosure. FIG. 2 illustrates some particular examples of node 10, and many other examples of node 10 may be used in other instances and may include a subset of the components included in example node 10 or may include additional components not shown in FIG. 2.

For example, node 10 may include a battery to provide power to the components of node 10, or node 10 may include more than one communication unit. Similarly, the components of node 10 shown in FIG. 2 may not be necessary in every example of node 10, such as input components 20 or output components 22. As shown in the example of FIG. 2, node 10 includes one or more processors 14, one or more input components 20, one or more output components 22, one or more communication units 24, and volatile memory 26.

Communication channels 28, represented by the solid lines in FIG. 2, may interconnect each of (or some subcombination of) the components 12, 14, 20, 22, 24, and 26 for inter-component communications (physically, communicatively, and/or operatively). In some examples, communication channels 28 may include a system bus, a network connection, an inter-process communication data structure, or any other method for communicating data. The communication channels for a particular set of components may be isolated from another set of components.

One or more communication units 24 of node 10 may communicate with external devices, such as a server device, a host device, secure client devices, and/or non-secure client devices, via one or more wired and/or wireless networks by transmitting and/or receiving network signals on the one or more networks. Communication units 24 may include a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, node 10 utilizes communication units 24 to wirelessly communicate with another node of a peer-to-peer network.

One or more processors 14, in one example, are configured to implement functionality and/or process instructions for execution within node 10. For example, processors 14 may be capable of processing instructions stored in local storage devices 12. Examples of processors 14 may include, any one or more of a microprocessor, a controller, a digital signal processor (DSP), an application specific integrated circuit (ASIC), a field-programmable gate array (FPGA), or equivalent discrete or integrated logic circuitry.

Node 10 may include one or more input components 20. For instance, node 10 may be configured to receive input from a user through tactile, audio, or video feedback. Examples of input components 20 include a display component, a mouse, a keyboard, a camera, a microphone or any other type of device for detecting input from a user. In some examples, a display component includes a touch-sensitive screen. Node 10 may also include a structure capable of receiving a radio signal. For instance, input components 20 may include a radio antenna, a radio receiver, a communication receiver, or a scanner, among other things.

Node 10 may additionally include one or more output components 22. Output components 22, in some examples, are configured to provide output to a user using tactile, audio, or video stimuli. Output components 22, in one example, include an electronic display, a loudspeaker, or any other type of device for converting a signal into an appropriate form understandable to humans or machines. The electronic display may be a liquid crystal display (LCD) or organic light-emitting diode (PLED) part of a touch screen, may be a non-touchscreen direct view display component such as a cathode ray tube (CRT), light-emitting diode (LED), LCD, or OLED. The display component may also be a projector instead of a direct view display.

Volatile memory 26 may be utilized for temporary storage or for storing contents while the contents are being read by processors 14. For instance, encrypted data file 30 stored in storage devices 12 may be unencrypted and stored in volatile memory 26 while processors 14 are reading and utilizing information within encrypted data file 30, and further deleted from volatile memory 26 when processors 14 are not utilizing encrypted data file 30. Volatile memory 26 does not maintain stored contents when node 10 is turned off. Examples of volatile memory 26 include random access memories (RAM), dynamic random access memories (DRAM), static random access memories (SRAM), and other forms of volatile memories known in the art. In some examples, volatile memory 26 is used to store program instructions for execution by processors 14.

Node 10 may include one or more local storage devices 12. In some examples, storage devices 12 may include one or more computer-readable storage media. Storage devices 12 may be configured to store larger amounts of information than volatile memory. Storage devices 12 may further be configured for long-term storage of information. In some examples, storage devices 12 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. Local storage devices 12 may store encrypted data file 30, file distributed hash table 32, and peer distributed hash table 34 in long-term storage.

The computer readable storage media of local storage device 12 may include volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processors 14.

Node 10 executes a hypervisor 33 to manage modules 36, 38, 40, and 42 in the instance where modules 36, 38, 40, and 42 are virtual machines. Example hypervisors include Kernel-based Virtual Machine (KVM) for the Linux kernel, Xen, ESXi available from VMware, Windows Hyper-V available from Microsoft, and other open-source and proprietary hypervisors. Hypervisor 33 may represent a virtual machine manager (VMM). Hypervisor 33 provides one or more physical driver(s) 35 to use the physical functions of any employed hardware, including network interface card(s), storage device(s), input and output devices.

Node 10 may further store UI module 36, PKI service module 38, peer-to-peer (P2P) hosting service module 40, and peer-to-peer (P2P) client module 42. Modules 36, 38, 40, and 42 may perform operations described using software, hardware, firmware, or a mixture of hardware, software, and firmware residing in and/or executing at node 10. Modules 36, 38, 40, and 42 may operate as stand-alone programs, functions of an operating system, virtual machines, a function of specialized hardware or embedded hardware, or any other type of hardware or software component. Node 10 may execute modules 36, 38, 40, and 42 with one or more processors 14. Node 10 may execute modules 36, 38, 40, and 42 as a virtual machine executing on underlying hardware. Modules 36, 38, 40, and 42 may execute as a service or component of an operating system or computing platform. Modules 36, 38, 40, and 42 may execute as one or more executable programs at an application layer of a computing platform. Modules 36, 38, 40, and 42 may be otherwise arranged remotely to and remotely accessible to node 10, for instance, as one or more network services operating at a network in a network cloud. In other words, modules 36, 38, 40, and 42 may not be executing at node 10. Instead, modules 36, 38, 40, and 42 may be executing at a remote computing system (e.g., a server).

Modules 36, 38, 40, and 42 may be stored in long-term storage, such as local storage devices 12. However, when modules 36, 38, 40, and 42 are executed by processor 14, processor 14 may read modules 36, 38, 40, and 42 into volatile memory 26. Modules 36, 38, 40, and 42 may be stored in volatile memory 26 throughout processor 14's execution of modules 36, 38, 40, and 42. Modules 36, 38, 40, and 42 may be configured to operate as stand-alone programs, as part of an operating system, as executed by a virtual machine, and/or as a shell surrounding another program, among other things.

PKI service module 38 may generally be responsible for three services: Key Management, Data Protection, and Authentication. The Key Management service of PKI service module 38 may maintain key stores of user-specific public certificates, mission-specific certificates, and local user private keys, each of which may be used to identify various nodes within the peer-to-peer network. PKI service module 38 may utilize these data stores in the Data Protection service to perform asymmetric encryption and decryption operations on files shared between nodes in the peer-to-peer network to secure the files both while at rest and in transit. Similarly, PKI service module 38 may employ the Authentication service to perform digital signature operations that validate peer identities and provide non-repudiation security within the peer-to-peer network.

P2P hosting service module 40 may generate and distribute the required file sharing information for any data made available on the network, which includes metadata such as file segment size and cryptographic hash values of each file segment stored by a node, such as node 10. Respective P2P hosting service modules 40 on nodes within the peer-to-peer network coordinate via their Hosting Services to disseminate all file sharing metadata using an efficient distributed hash table representation. The distributed hash table representation utilizes file distributed hash table 32 and peer distributed hash table 34 to provision local portions of the network's overall file sharing and peer tracking metadata, respectively. Based on application settings, P2P hosting service module 40 can interact with PKI service module 38 to encrypt the two distributed hash tables, and P2P hosting service module 40 can control the degree of metadata redundancy by adjusting the amount of overlap in stored table entries of peers with neighboring hash indices.

P2P client module 42 may carry out the actual data transfer between network peers using the metadata provided by P2P hosting service module 40, file distributed hash table 32, and peer distributed hash table 34. P2P client module 42 may also search the available shared data based on the user's credentials, which will enable users to download new data and become another peer for sharing it with other users.

In accordance with the techniques of this disclosure, processor 14 of node 10 may execute PKI service module 38 to store an encrypted file in local storage device 12. For instance, node 10 may be a desktop computer at a local headquarters connected to a peer-to-peer network, such as a mobile ad-hoc network, an unstructured peer-to-peer network, a tactical airborne network, a secure peer-to-peer network, or a structured peer-to-peer network. A second node of the peer-to-peer network may be a weapons system in the field, the second node being communicatively connected to the same peer-to-peer network as node 10. Encrypted data file 30 may contain coordinates of a location that the weapons system should target for a particular mission.

Processor 14 of node 10 may execute P2P hosting service module 40 to create file information metadata comprising details of encrypted data file 30. For instance, P2P hosting service module 40 may determine, for encrypted data file 30 containing the coordinates, a file segment size of encrypted data file 30, a file header for encrypted data file 30, a cryptographic hash value of a segment of encrypted data file 30 stored at node 10, an identifier of node 10, or an identifier of encrypted data file 30. P2P hosting service module 40 may then create metadata that corresponds to the determined information. In some examples, rather than a single encrypted file, encrypted data file 30 may comprise a piece of or the entirety of a shared data object consisting of a logical construct representing an organized collection of files.

Processor 14 of node 10 may also execute P2P hosting service module 40 create peer information metadata comprising details of node 10. For instance, P2P hosting service module 40 may determine an identity of node 10, a clearance level of node 10, a connection status of node 10, an internet protocol address of node 10, or public key information for node 10. Processor 14 may then create an indication of such information in the form of peer information metadata.

P2P hosting service module 40 may update file distributed hash table 32 to include the file information metadata and peer distributed hash table 34 to include the peer information metadata. At least a portion of file distributed hash table 32 is stored on a first group of one or more nodes in the peer-to-peer network, including node 10, and at least a portion of peer distributed hash table 34 is stored on a second group of one or more nodes in the peer-to-peer network, including node 10. For instance, each of the nodes in the peer-to-peer network may store at least a portion of file distributed hash table 32 and/or peer distributed hash table 34. In other examples, however, some nodes in the peer-to-peer network may not store any portions file distributed hash table 32 or peer distributed hash table 34.

Node 10, as well as other nodes in the peer-to-peer network, may retrieve the various portions of file distributed hash table 32 and peer distributed hash table 34, either from their own local storage devices 12 or from other nodes, in order to determine a mapping of the file storage environment. For instance, the weapons system may require encrypted data file 30 that contains the target coordinates. As such, the weapons system may retrieve file distributed hash table 32 in order to determine information regarding encrypted data file 30 and which of the nodes in the peer-to-peer network are storing a local copy of encrypted data file 30. After determining that node 10 is storing a copy of encrypted data file 30 of the coordinates needed by the weapons system, the weapons system may utilize peer distributed hash table 34 in order to determine various characteristics of node 10. P2P client module 42 may receive a request for the encrypted file from the weapons system. Upon receiving the request, P2P client module 42 may check peer distributed hash table 34 to determine whether the weapons system is a trusted computing device. For instance, P2P client module 42 may determine a clearance level for the weapons system to ensure that the weapons system meets a minimum clearance level for encrypted data file 30 and that the weapons system is not receiving any information above the clearance level for the weapons system. If P2P client module 42 verifies that the weapons system may receive the file, P2P client module 42 may send a copy of at least the requested portion of encrypted data file 30, in encrypted form, across the peer-to-peer network to the weapons system. The weapons system may locally decrypt encrypted data file 30 in volatile memory when reading the file to determine the coordinates.

In some examples, in addition to the request, P2P client module 42 may receive a key specific to the weapons system. PKI service module 38 may then compare the key with one or more entries of a trusted peer database, which may be a portion of peer distributed hash table 34. Responsive to determining that the key for the weapons system is included in the trusted peer database, P2P client module 42 may send at least the portion of encrypted data file 30 to the weapons system.

In some examples, after sending encrypted data file 30 to the weapons system, P2P hosting service module 40 may update file distributed hash table 32 to include second file information metadata and peer distributed hash table 34 to include second peer information metadata. The second file information metadata may include details of at least the portion of encrypted data file 30 sent to the weapons system. The second peer information metadata may include details of the identity of the weapons system. In other words, after sending encrypted data file 30, node 10, as the sending node, may be tasked with updating the distributed hash tables to indicate that the weapons system, as the recipient node, now has a copy of encrypted data file 30 stored locally on the weapons system.

In some examples, node 10 may store multiple encrypted data files. For instance, in addition to the target coordinates, node 10 may be storing a second encrypted data file that includes an Internet Protocol address of a computing system outside of the peer-to-peer network. P2P client module 42 may receive a first request for at least a portion of encrypted data file 30 from the weapons system. P2P client module 42 may also receive a second request for at least a portion of the second encrypted file from a third node in the peer-to-peer network, such as a laptop computer. Due to the limited bandwidth existing in many peer-to-peer networks, node 10 may need to determine which of the request should be satisfied first. P2P hosting service module 40 may grant a higher priority to the request received first in a first-in-first-out algorithm. In other instance, node 10 may grant a higher priority to the request that is requesting a file stored on the fewest number of devices within the peer-to-peer network.

For example, P2P hosting service module 40 may determine, based at least in part on file distributed hash table 32, a number of computing devices in the peer-to-peer network that have ownership of encrypted data file 30 and a number of computing devices in the peer-to-peer network that have ownership of the second encrypted file. If the number of computing devices that have ownership of the encrypted data file 30 is less than the number of computing devices that have ownership of the second encrypted file, P2P client module 42 may send at least the portion of encrypted data file 30 to the weapons system prior to sending at least the portion of the second encrypted file to the laptop computer. Conversely, if the number of computing devices that have ownership of the second encrypted file is less than the number of computing devices that have ownership of the first encrypted file, P2P client module 42 may send at least the portion of the second encrypted file to the laptop computer prior to sending at least the portion of encrypted data file 30 to the weapons system.

Similarly, node 10 may use a priority ranking system when node 10 is making multiple requests for different encrypted files. As such, P2P hosting service module 42 may determine, based at least in part on file distributed hash table 32 and peer distributed hash table 34, a number of computing devices in the peer-to-peer network that have ownership of a second encrypted file and a number of computing devices in the peer-to-peer network that have ownership of a third encrypted file. If the number of computing devices that have ownership of the second encrypted file is less than the number of computing devices that have ownership of the third encrypted file, P2P client module 42 may send, to a second computing device that has ownership of the second encrypted file, a request for at least a portion of the second encrypted file prior to sending a request for at least a portion of the third encrypted file to a third computing device that has ownership of the third encrypted file. Conversely, if the number of computing devices that have ownership of the third encrypted file is less than the number of computing devices that have ownership of the second encrypted file, P2P client module 42 may send the request for at least the portion of the third encrypted file to the third computing device prior to sending the request for at least the portion of the second encrypted file to the second computing device. By prioritizing the encrypted files with the smallest amount of ownership, with the high level of mobility on devices within such peer-to-peer networks, files with low ownership are shared first for preservation prior to computing devices leaving the peer-to-peer network.

In addition to receiving requests for encrypted data file 30 and sending encrypted data file 30 to other computing devices, node 10 may also be configured to request encrypted data files from other computing devices. For instance, P2P hosting service module 40 may determine, based at least in part on file distributed hash table 32 and peer distributed hash table 34, a second computing device in the peer-to-peer network that contains a second encrypted file (e.g., an encrypted file containing information about key personnel involved with a current mission). P2P client module 42 may send a request for at least a portion of the second encrypted file and an indication of an identity of node 10 to the second computing device. P2P client module 42, so long as it passes any clearance checks that the second computing device may perform, may then receive at least the portion of the second encrypted file, in encrypted form, from the second computing device.

In some such examples, node 10, being the recipient node in this example, may be tasked with updating file distributed hash table 32 and peer distributed hash table 34. For instance, P2P hosting service module 40 may update file distributed hash table 32 to include second file information metadata and peer distributed hash table 34 to include second peer information metadata. The second file information metadata may include details of at least the portion of the second encrypted file, and the second peer information metadata may include details of the identity of node 10. In other words, after receiving the second encrypted file, node 10, as the recipient node, may be tasked with updating the distributed hash tables to indicate that node 10 now has a copy of the second encrypted file stored locally on storage devices 12.

In some examples, such as examples where node 10 may be a weapons system, node 10 may not include input components 20 or output components 22. In such examples, UI module 36 must receive instructions from an external computing device in order to send encrypted files to other computing devices or to send requests for encrypted files to other computing device. For instance, UI module 36 may receive an indication of input from a remote computing device, such as an external tablet computer communicatively connected to node 10, to send at least a portion of encrypted data file 30 to a second computing device. Responsive to receiving the indication from the remote computing device, P2P client module 42 may send at least the portion of encrypted data file 30 to the second computing device in encrypted form.

In other instances, UI module 36 may receive an indication of input from the remote computing device to request at least a portion of a second encrypted file from a second computing device of the peer-to-peer network. P2P client module 42 may then send a request for at least the portion of the second encrypted file and an indication of an identity of node 10. P2P client module 42 may receive at least the portion of the second encrypted file in encrypted form from the second computing device.

Figure 3:
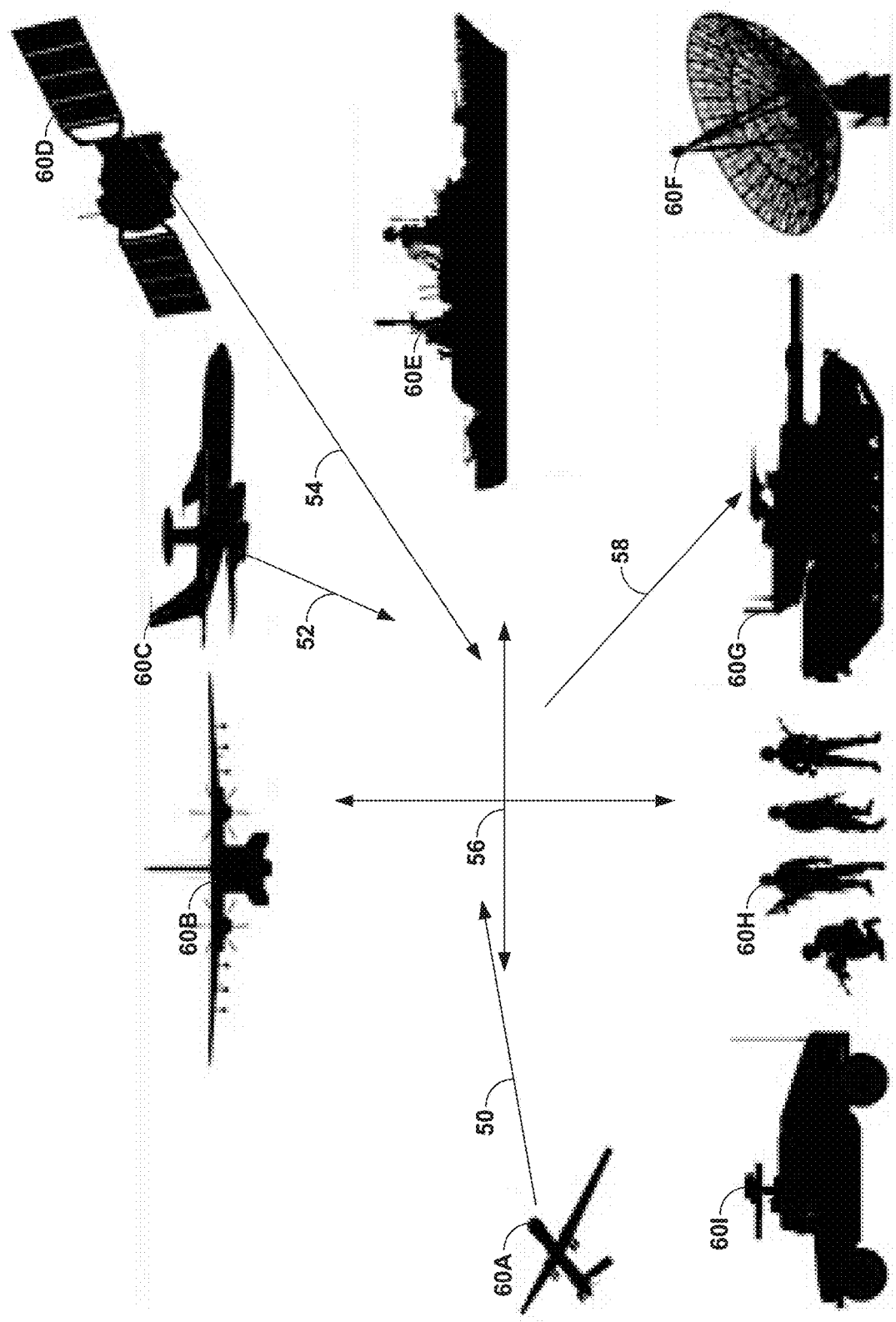
FIG. 3 is a conceptual diagram illustrating an example peer-to-peer network that includes a variety of types of nodes configured to store and distribute encrypted files in a distributed manner, in accordance with one or more techniques of this disclosure.

FIG. 3 is a conceptual diagram illustrating an example peer-to-peer network 56 that includes a variety of types of nodes 60A-60I configured to store encrypted files in a distributed manner, in accordance with one or more techniques of this disclosure. Nodes 60A-60I (collectively, nodes 60) are communication devices that include a local storage device and one or more processors configured to perform the techniques described herein. For instance, nodes 60 may be a processing unit on any one of a tablet computer, a smartphone, a personal digital assistant (PDA), a laptop computer, a navigation system, a digital camera, a computerized vehicle, a computerized aircraft, a weapons system, a satellite system, a surveillance drone, an unmanned aerial vehicle (UAV), a computerized aquatic vehicle, a computerized watch (e.g., a smart watch), computerized eyewear, computerized headwear, other types of wearable computing devices, a media player, a television platform, or any other type of mobile and/or non-mobile computing device that is configured to perform a media operation as described herein.

In the example of FIG. 3, node 60A may be a processing unit on a UAV. Nodes 60B and 60C may each be processing units on different computerized aircrafts. Nodes 60D and 60F may each be a processing unit on a satellite system. Node 60E may be a processing unit on a computerized aquatic vehicle. Node 60G may be a processing unit on a computerized tank. Node 60H may be a processing unit on a PDA. Finally, node 60I may be a processing unit of a weapons system on a vehicle.

In the example of FIG. 3, node 60G may require three data files stored on various other nodes: infrared data, radar data, and optical data. Node 60G may reference a file distributed hash table and a peer distributed hash table to determine that node 60A is storing a copy of the required infrared data, node 60C is storing a copy of the required radar data, and node 60D is storing a copy of the required optical data. As such, node 60G may send requests to each of nodes 60A, 60C, and 60D for the respective encrypted files. Node 60A may send the infrared data into peer-to-peer network 56 over link 50. Node 60C may send the radar data into peer-to-peer network 56 over link 52. Node 60D may send the optical data into peer-to-peer network 56 over link 54. Node 60G may receive each of these encrypted files from peer-to-peer network 56 over link 58 and store each of these encrypted files, in encrypted form, on the local storage device of node 60G.

Figure 4:
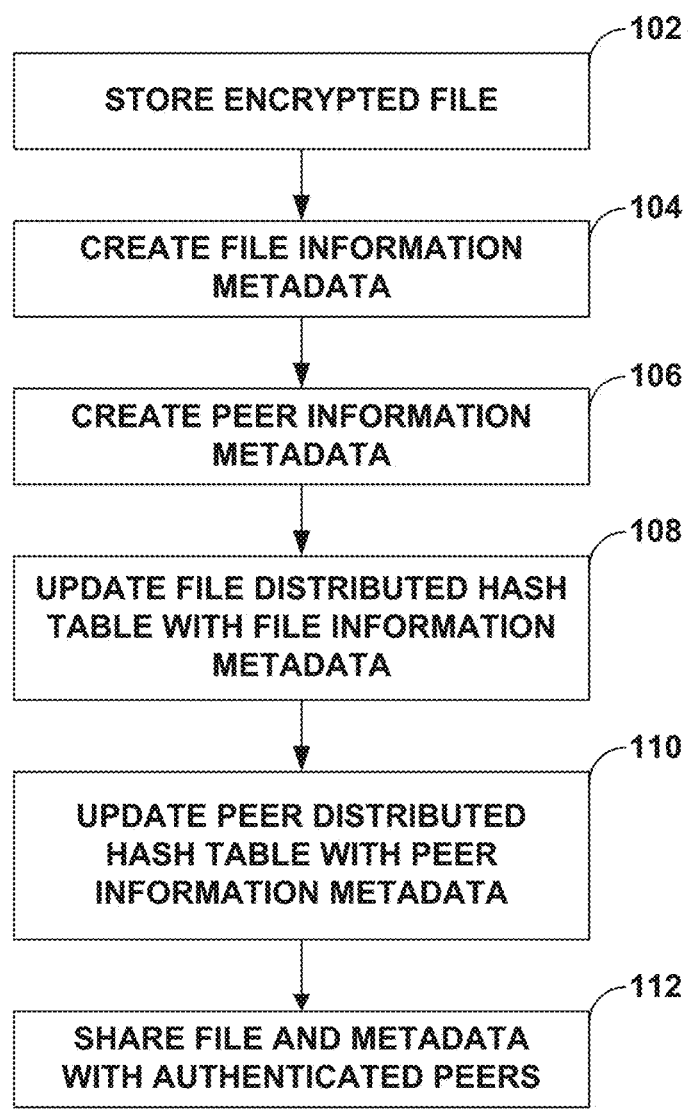
FIG. 4 is a flow diagram illustrating example operations of a node configured to store and distribute encrypted files in a distributed manner on a peer-to-peer network, in accordance with one or more techniques of this disclosure.

FIG. 4 is a flow diagram illustrating example operations of a node configured to store encrypted files in a distributed manner on a peer-to-peer network, in accordance with one or more techniques of this disclosure. The techniques of FIG. 4 may be performed by one or more processors of a computing device, such as node 10A illustrated in FIG. 1 and/or node 10 illustrated in FIG. 2. For purposes of illustration only, the techniques of FIG. 4 are described within the context of node 10A of FIG. 1, although computing devices having configurations different than that of node 10A may perform the techniques of FIG. 4. While the techniques described below with respect to FIG. 4 are described as being performed by processors 14A, processors 14A may utilize other modules or applications, such as a virtual machine, to perform all or a portion of the techniques described herein.

In accordance with the techniques of this disclosure, processor 14A of node 10A may store an encrypted file in local storage device 124 (102). For instance, node 10A may be a laptop computer connected to peer-to-peer network 4. Node 10B may be a vehicle with an on-board system communicatively connected to peer-to-peer network 4. The encrypted file may contain an itinerary with timing information for a particular mission.

Processor 14A of node 10A may create file information metadata comprising details of the encrypted file (104). For instance, processor 144 may determine, for the file containing the itinerary, a file segment size of the encrypted file, a file header for the encrypted file, a cryptographic hash value of a segment of the encrypted file stored at node 10A, an identifier of node 10A, or an identifier of the encrypted file. Processor 14A may then create metadata that corresponds to the determined information.

Processor 14A of node 10A may also create peer information metadata comprising details of node 10A (106). For instance, processor 144 of node 10A may determine an identity of node 10A, a clearance level of node 10A, a connection status of node 10A, an interact protocol address of node 10A, or public key information for node 10A. Processor 14A may then create an indication of such information in the form of peer information metadata.

Processor 14A may update a file distributed hash table to include the file information metadata (108) and a peer distributed hash table to include the peer information metadata (110). At least a portion of the file distributed hash table is stored on a first group of one or more nodes of nodes 10, and at least a portion of the peer distributed hash table is stored on a second group of one or more nodes of nodes 10. For instance, each of nodes 10 may store at least a portion of the file distributed hash table and/or the peer distributed hash table.

Processor 14A may share the file and the metadata with authenticated peers (e.g. nodes 10) (112). Each of nodes 10 may retrieve the various portions of the file distributed hash table and the peer distributed hash table, either from their own local storage devices or from other nodes, in order to determine a mapping of the file storage environment. For instance, node 10B may require the encrypted file that contains the itinerary of the location that node 10B must travel to. As such, node 10B may retrieve the file distributed hash table in order to determine information regarding the encrypted file and which of nodes 10 is storing a local copy of the encrypted file. After determining that node 10A is storing a copy of the encrypted file of the itinerary needed by node 10B, node 10B may utilize the peer distributed hash table in order to determine various characteristics of node 10A such that node 10B may send a request for the encrypted file to node 10A. Upon receiving the request, node 10A may check the peer distributed hash table for clearance information for node 10B to ensure that node 10B is not receiving any information above the clearance level for node 10B. If node 10A verities that node 10B may receive the file, node 10A may send a copy of the encrypted file, in encrypted form, across peer-to-peer network 4 to node 10B. Node 10B may locally decrypt the encrypted file in volatile memory when reading the file to determine the itinerary.

Figure 5:
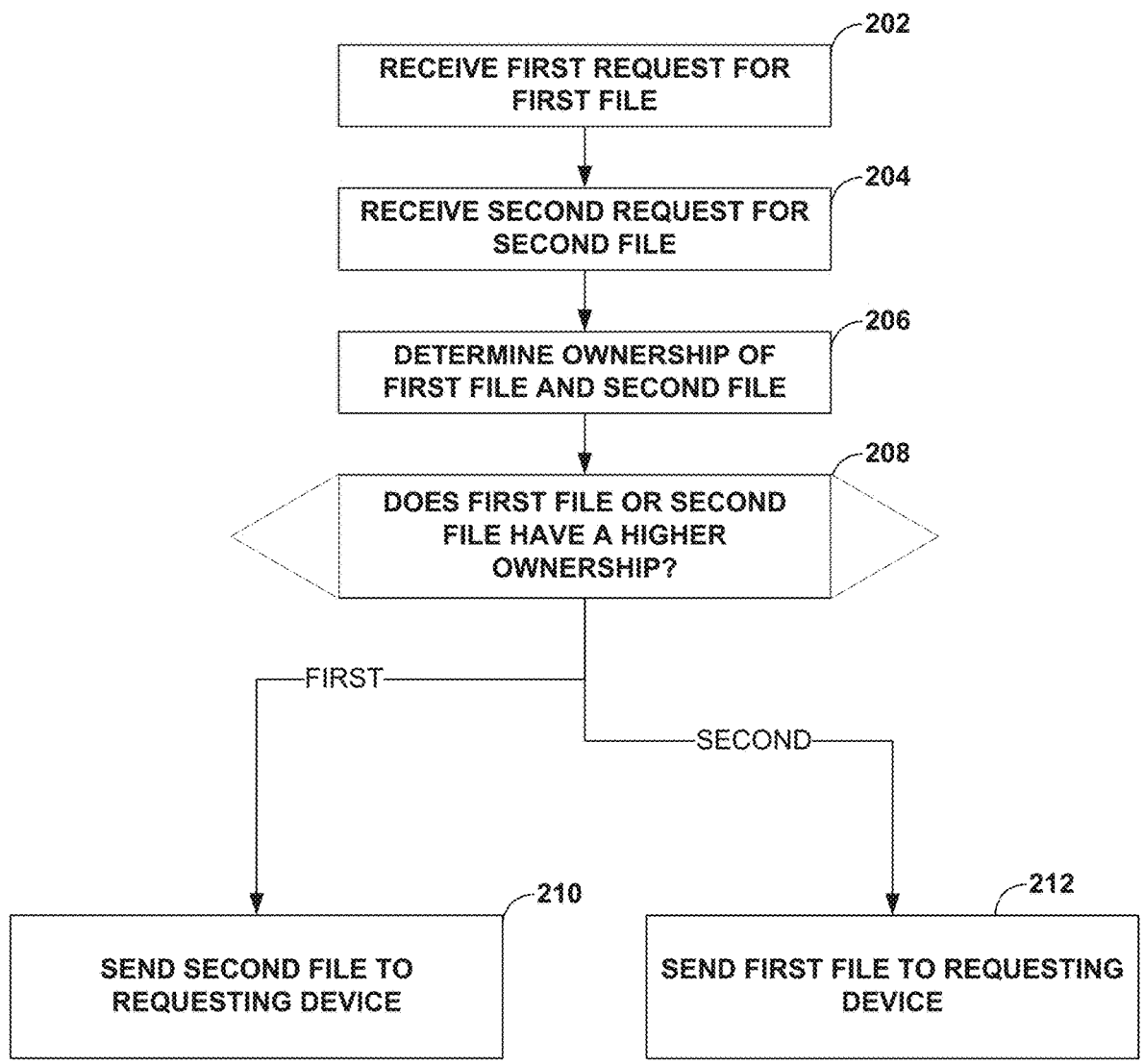
FIG. 5 is a flow diagram illustrating example operations of a node configured to store and distribute encrypted files in a distributed manner on a peer-to-peer network, in accordance with one or more techniques of this disclosure.

FIG. 5 is a flow diagram illustrating example operations of a node configured to store encrypted files in a distributed manner on a peer-to-peer network, in accordance with one or more techniques of this disclosure. The techniques of FIG. 5 may be performed by one or more processors of a computing device, such as node 10A illustrated in FIG. 1 and/or node 10 illustrated in FIG. 2. For purposes of illustration only, the techniques of FIG. 5 are described within the context of node 10A of FIG. 1, although computing devices having configurations different than that of node 10A may perform the techniques of FIG. 5. While the techniques described below with respect to FIG. 5 are described as being performed by processors 14A, processors 14A may utilize other modules or applications, such as a virtual machine, to perform all or a portion of the techniques described herein.

In accordance with the techniques described herein, processor 144 of node 10A may receive, from node 10B, a first request for at least a portion of the first encrypted file (202). Processor may further receive, from node 10C, a second request for at least a portion of a second encrypted file (204). In such a case, processor 14A, in order to maintain the highest potential level of integrity within the peer-to-peer network, may fulfill the request of whichever node is requesting a file stored on fewer devices in the peer-to-peer network.

For instance, processor 14A may determine, based at least in part on the file distributed hash table, a number of nodes in the peer-to-peer network that have ownership of the first encrypted file and a number of nodes in the peer-to-peer network that have ownership of the second encrypted file (206). Processor 14A may compare the two ownerships to determine whether the ownership of the first file is greater than the ownership of the second file (208).

Responsive to determining that the number of nodes that have ownership of the first encrypted file is greater than the number of nodes that have ownership of the second encrypted file ("FIRST" branch of 208), processor 14A may send, to node 10C, at least the portion of the second encrypted file prior to sending at least the portion of the first encrypted file to node 10B (210). Conversely, responsive to determining that the number of nodes that have ownership of the second encrypted file is greater than the number of nodes that have ownership of the first encrypted file ("SECOND" branch of 208), processor 14A may send, to node 10B, at least the portion of the first encrypted file prior to sending at least the portion of the second encrypted file to node 10C (212). In doing so, node 10A increases the number of nodes that have ownership of the lesser-owned file within the peer-to-peer network, decreasing the risk that all nodes having ownership of the lesser-owned file leave the peer-to-peer network and make the file unrecoverable.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
   storing, by a first computing device in a peer-to-peer network comprising a plurality of computing devices, a first encrypted file in a data storage component;
   creating, by the first computing device, and from the first encrypted file, file information metadata comprising details of the first encrypted file;
   creating, by the first computing device, peer information metadata comprising details of the first computing device;
   updating, by the first computing device, a file distributed hash table to include the file information metadata and a peer distributed hash table to include the peer information metadata, wherein at least a portion of the file distributed hash table is stored on a first group of one or more computing devices of the plurality of computing devices, and wherein at least a portion of the peer distributed hash table is stored on a second group of one or more computing devices of the plurality of computing devices;
   receiving, by the first computing device and from a second computing device of the plurality of computing devices, a first request for at least a portion of the first encrypted file;
   receiving, by the first computing device and from a third computing device of the plurality of computing devices, a second request for at least a portion of a second encrypted file;
   determining, by the first computing device and based at least in part on the file distributed hash table, a number of computing devices in the plurality of computing devices that have ownership of the first encrypted file and a number of computing devices in the plurality of computing devices that have ownership of the second encrypted file;
   responsive to determining that the number of computing devices that have ownership of the first encrypted file is less than the number of computing devices that have ownership of the second encrypted file, sending, by the first computing device and to the second computing device, at least the portion of the first encrypted file prior to sending at least the portion of the second encrypted file to the third computing device; and
   responsive to determining that the number of computing devices that have ownership of the second encrypted file is less than the number of computing devices that have ownership of the first encrypted file, sending, by the first computing device and to the third computing device, at least the portion of the second encrypted file prior to sending at least the portion of the first encrypted file to the second computing device.

2. The method of claim 1, further comprising:
   receiving, by the first computing device and from the second computing device of the plurality of computing devices, a third request for at least a portion of the first encrypted file and an indication of an identity of the second computing device;
   determining, by the first computing device and based at least in part on the indication of the identity of the second computing device and the peer distributed hash table, that the second computing device is a trusted computing device; and
   responsive to determining that the second computing device is a trusted computing device, sending, by the first computing device and to the second computing device, at least the portion of the first encrypted file to the second computing device in encrypted form.

3. The method of claim 2, further comprising, responsive to receiving the third request from the second computing device:
   determining, by the first computing device and based at least in part on the indication of the identity of the second computing device and the peer distributed hash table, a clearance level for the second computing device;
   determining, by the first computing device, a minimum clearance level for the first encrypted file; and
   responsive to determining that the clearance level for the second computing device meets the minimum clearance level for the first encrypted file, sending, by the first computing device and to the second computing device, at least the portion of the first encrypted file to the second computing device.

4. The method of claim 2, wherein sending at least the portion of the first encrypted file to the second computing device comprises sending, by the first computing device and to the second computing device, at least the portion of the first encrypted file to the second computing device over an encrypted channel of the peer-to-peer network.

5. The method of claim 2, further comprising, responsive to receiving the third request from the second computing device:
   receiving, by the first computing device and from the second computing device, a key;
   comparing, by the first computing device, the key with one or more entries of a trusted peer database; and
   responsive to determining that the key for the second computing device is included in the trusted peer database, sending, by the first computing device and to the second computing device, at least the portion of the first encrypted file to the second computing device.

6. The method of claim 2, further comprising:
   updating, by the first computing device, the file distributed hash table to include second file information metadata and the peer distributed hash table to include second peer information metadata, wherein the second file information metadata is created using the first encrypted file and comprises details of at least the portion of the first encrypted file sent to the second computing device, and wherein the second peer information metadata comprises details of the identity of the second computing device.

7. The method of claim 1, further comprising:
   receiving, by the first computing device, an indication of input from a remote computing device to send at least a portion of the first encrypted file to the second computing device of the plurality of computing devices; and
   responsive to receiving the indication from the remote computing device, sending, by the first computing device and to the second computing device, at least the portion of the first encrypted file to the second computing device in encrypted form.

8. The method of claim 1, further comprising:
   determining, by the first computing device and based at least in part on the file distributed hash table and the peer distributed hash table, a fourth computing device of the plurality of computing devices that contains the second encrypted file;
   sending, by the first computing device and to the fourth computing device, a third request for at least a portion of the second encrypted file and an indication of an identity of the first computing device; and receiving, by the first computing device and from the fourth computing device, at least the portion of the second encrypted file in encrypted form.

9. The method of claim 8, further comprising:
updating, by the first computing device, the file distributed hash table to include second file information metadata and the peer distributed hash table to include second peer information metadata, wherein the second file information metadata is created using the first encrypted file and comprises details of at least the portion of the second encrypted file, and wherein the second peer information metadata comprises details of the identity of the first computing device.

10. The method of claim 1, further comprising:
receiving, by the first computing device, an indication of input from a remote computing device to request at least a portion of the second encrypted file from a fourth computing device of the plurality of computing devices;
sending, by the first computing device and to the fourth computing device, a third request for at least the portion of the second encrypted file and an indication of an identity of the first computing device; and
receiving, by the first computing device and from the fourth computing device, at least the portion of the second encrypted file in encrypted form.

11. The method of claim 1, wherein the peer-to-peer network comprises one or more of a mobile ad-hoc network, an unstructured peer-to-peer network, a tactical airborne network, a secure peer-to-peer network, or a structured peer-to-peer network.

12. The method of claim 1, wherein the file information metadata includes one or more of a file segment size, a file header, a cryptographic hash value of a segment of the first encrypted file stored at the first computing device, an identifier of the first computing device, and an identifier of the first encrypted file.

13. The method of claim 1, wherein the peer information metadata includes one or more of an indication of an identity of the first computing device, a clearance level of the first computing device, a connection status, an internet protocol address, and public key information.

14. A first computing device in a in a peer-to-peer network comprising a plurality of computing devices, the first computing device comprising:
a memory configured to store a first encrypted file; and
at least one processor in communication with the memory, the at least one processor being configured to:
create, from the first encrypted file, file information metadata comprising details of the first encrypted file;
create peer information metadata comprising details of the first computing device;
update a file distributed hash table to include the file information metadata and a peer distributed hash table to include the peer information metadata, wherein at least a portion of the file distributed hash table is stored on a first group of one or more computing devices of the plurality of computing devices, and wherein at least a portion of the peer distributed hash table is stored on a second group of one or more computing devices of the plurality of computing devices;
receive, from a second computing device of the plurality of computing devices, a first request for at least a portion of the first encrypted file;
receive, from a third computing device of the plurality of computing devices, a second request for at least a portion of a second encrypted file;
determine, based at least in part on the file distributed hash table, a number of computing devices in the plurality of computing devices that have ownership of the first encrypted file and a number of computing devices in the plurality of computing devices that have ownership of the second encrypted file;
responsive to determining that the number of computing devices that have ownership of the first encrypted file is less than the number of computing devices that have ownership of the second encrypted file, send, to the second computing device, at least the portion of the first encrypted file prior to sending at least the portion of the second encrypted file to the third computing device; and
responsive to determining that the number of computing devices that have ownership of the second encrypted file is less than the number of computing devices that have ownership of the first encrypted file, send, to the third computing device, at least the portion of the second encrypted file prior to sending at least the portion of the first encrypted file to the second computing device.

15. The first computing device of claim 14, wherein the at least one processor is further configured to:
receive, from the second computing device of the plurality of computing devices, a request for at least a portion of the first encrypted file and an indication of an identity of the second computing device;
determine, based at least in part on the indication of the identity of the second computing device and the peer distributed hash table, that the second computing device is a trusted computing device; and
responsive to determining that the second computing device is the trusted computing device, send, to the second computing device, at least the portion of the encrypted file to the second computing device in encrypted form.

16. The computing device of claim 14, wherein the at least one processor is further configured to:
determine, based at least in part on the file distributed hash table and the peer distributed hash table, the second computing device of the plurality of computing devices that contains the second encrypted file;
send, to the second computing device, a request for at least a portion of the second encrypted file and an indication of an identity of the first computing device; and
receive, from the second computing device, at least the portion of the second encrypted file in encrypted form.

17. A non-transitory computer-readable storage medium storing instructions that, when executed, cause one or more processors of a first computing device in a in a peer-to-peer network comprising a plurality of computing devices to:
store a first encrypted file in a data storage component;
create, from the first encrypted file, file information metadata comprising details of the first encrypted file;
create peer information metadata comprising details of the first computing device;
update a file distributed hash table to include the file information metadata and a peer distributed hash table to include the peer information metadata, wherein at least a portion of the file distributed hash table is stored on a first group of one or more computing devices of the plurality of computing devices, and wherein at least a portion of the peer distributed hash table is stored on a second group of one or more computing devices of the plurality of computing devices;

receive by the first computing device and from a second computing device of the plurality of computing devices, a first request for at least a portion of the first encrypted file;

receive, by the first computing device and from a third computing device of the plurality of computing devices, a second request for at least a portion of a second encrypted file;

determine, by the first computing device and based at least in part on the file distributed hash table and the peer distributed hash table, a number of computing devices in the plurality of computing devices that have ownership of a second encrypted file and a number of computing devices in the plurality of computing devices that have ownership of a third encrypted file;

responsive to determining that the number of computing devices that have ownership of the second encrypted file is less than the number of computing devices that have ownership of the third encrypted file, sending, by the first computing device and to a second computing device that has ownership of the second encrypted file, a request for at least a portion of the second encrypted file prior to sending a request for at least a portion of the third encrypted file to a third computing device that has ownership of the third encrypted file; and responsive to determining that the number of computing devices that have ownership of the third encrypted file is less than the number of computing devices that have ownership of the second encrypted file, sending, by the first computing device and to the third computing device, the request for at least the portion of the third encrypted file prior to sending the request for at least the portion of the second encrypted file to the second computing device.

* * * * *